United States Patent [19]

Lawson

[11] Patent Number: 4,874,008

[45] Date of Patent: Oct. 17, 1989

[54] VALVE MOUNTING AND BLOCK MANIFOLD

[75] Inventor: John E. Lawson, Horsell Woking, England

[73] Assignee: Cameron Iron Works U.S.A., Inc., Houston, Tex.

[21] Appl. No.: 183,900

[22] Filed: Apr. 20, 1988

[51] Int. Cl.4 ............................................. F16K 43/00
[52] U.S. Cl. ................................. 137/315; 137/454.2; 251/152; 285/18
[58] Field of Search ............................ 137/315, 454.2; 251/151, 152; 285/18

[56] References Cited

U.S. PATENT DOCUMENTS 4,431,022  2/1984  Ripert .................................. 137/315
4,471,799  9/1984  Buck ..................................... 137/315

Primary Examiner—A. Michael Chambers

[57] ABSTRACT

A valve mounting for securing a valve body between two spaced apart mounting members having hydraulic studs which are elongated by pressure for release of the clamping engagement of the valve body for its quick and easy installation and removal. A preferred form of the present invention includes the application of a plurality of valve modules connected to the exterior of an elongate block manifold body through the use of hydraulic studs to control the flow into one of the longitudinal passages extending through the manifold body.

6 Claims, 5 Drawing Sheets

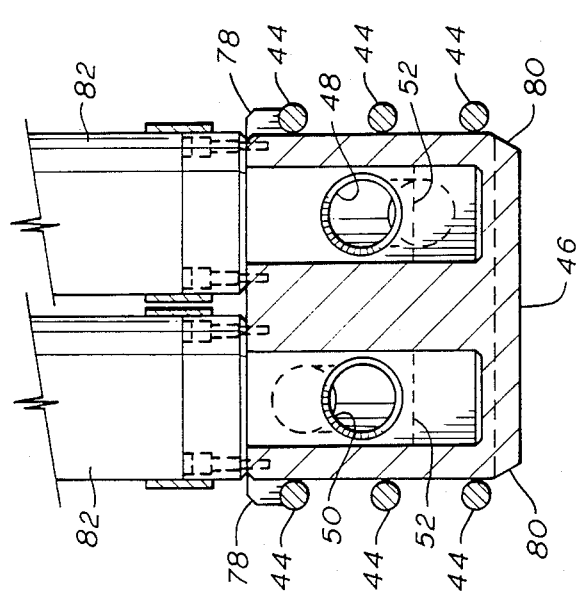
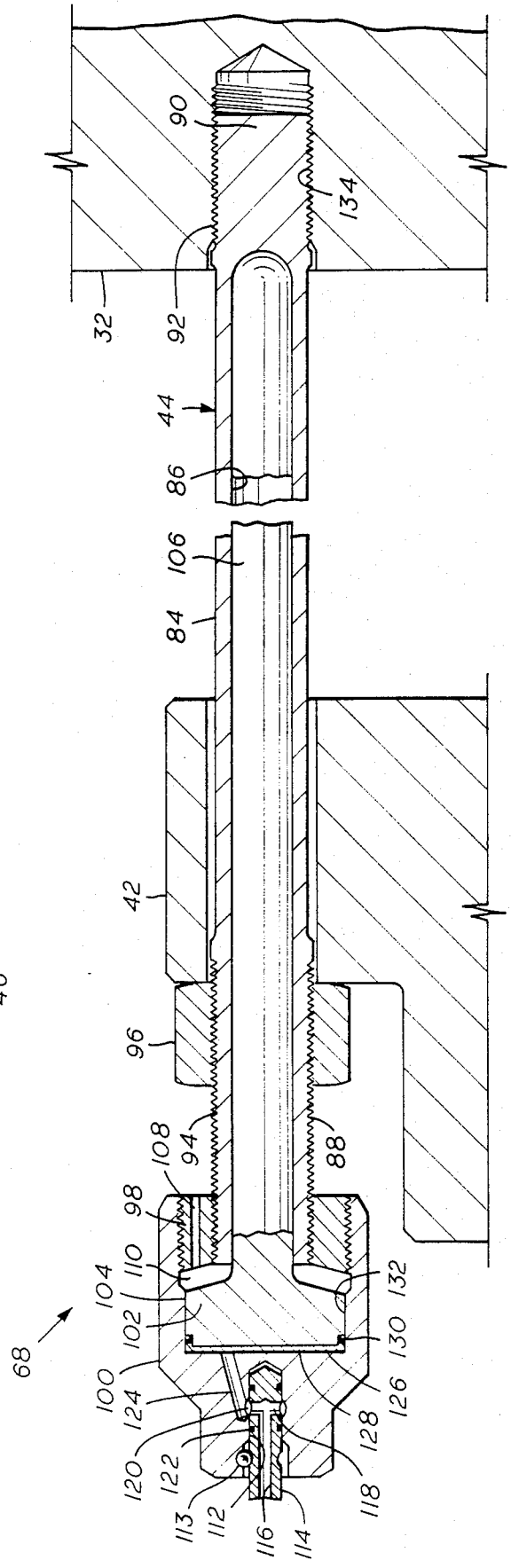

VALVE MOUNTING AND BLOCK MANIFOLD

BACKGROUND

The present invention relates to an improved valve mounting between spaced apart flat surfaces wherein the valve may be easily and quickly removed and replaced in environments such as subsea locations. A particular advantageous application of the present application is the connection of a plurality of subsea flow lines into a subsea block manifold with valves controlling the flow from the lines into one of two flow passages through the manifold.

Prior to the present invention, subsea flow line manifolds have been very large and have required individual valves to be suitably connected to both the manifold and to the individual flow lines. Further, difficulties have been encountered with the removal and replacement of valves on such subsea manifolds with a remotely operated vehicle or with remotely operated tools and some locations are sufficiently deep to limit access by divers.

Valves have been secured to a body having longitudinal flow passages therein to control the flow through the passages. The H. Allen, U.S. Pat. No. 3,095,007 discloses such a device and the valves are bolted into the body and the valve members are positioned within the flow passages in position to control the flow therethrough.

Ball valves have been suggested to be made in the form of a cartridge which is inserted between spaced apart flanges with studs spanning the flanges to tighten them onto the cartridge once it is in proper position. Examples of this type of structure are shown in the J. Gachot, U.S. Pat. No. 3,409,268 and the D. Scaramucci, U.S. Pat. No. 3,339,885. Gachot in FIG. 2 clearly shows that the valve member may be removed by loosening the nuts on the studs but without removing the studs.

The R. L. Ripert, U.S. Pat. No. 4,431,022 discloses a cartridge type of ball valve with the valve member being positioned within a box or rigid framework and with seal rings which are extensible and retractable responsive to fluid pressure delivered to opposite sides of an operating piston.

The F. E. Buck, U.S. Pat. No. 4,471,799 discloses a cartridge type of valve similar to the Ripert patent but the two heavy metal plates between which the valve cartridge is positioned are secured together by studs spanning the plates and extending down each side and across the lower portion in a U-shape. The corners of the plates are provided with hydraulic rams 44 which are used to separate the plates after the nuts on the studs have been loosened so that the cartridge can be removed from and/or inserted between the two heavy metal plates.

The D. B. Cowx, U.S. Pat. No. 4,424,988 discloses a frangible pipe coupling having flanges connected by studs of preselected reduced diameter and having an annular piston positioned to apply rupture loading on the studs to separate the members of the joint.

The A. G. Ahlstone, U.S. Pat. No. 4,153,278 discloses a misalignment connector having a collet type of connector which is actuated by hydraulic actuators.

The J. F. Arnold, U.S. Pat. No. 4,045,054 discloses a misalignment joint in which the sealing members are actuated into sealing position by hydraulic piston loading.

SUMMARY

The present invention includes a valve body which is secured in position between surfaces and secured therein by hydraulic studs which are elongated by pressure for quick and easy release of the valve body. A preferred form of the present invention includes the application of a plurality of valve modules connected to the exterior of an elongate manifold body through the use of hydraulic studs to control the flow into one of the longitudinal passages extending through the manifold body. Pressurizing of the hydraulic studs releases the valve body from engagement with the manifold body and allows its removal by diver, a remotely operated vehicle or by remotely operated tools.

An object of the present invention is to provide an improved valve and valve mounting which allows quick and easy removal and replacement of the valve body from and into a position between spaced apart surfaces.

Another subject is to provide an improved manifold for connecting to a plurality of flow lines which is substantially more compact than the manifolds of the prior art.

A further object is to provide an improved valved manifold having valve modules which are easily removed without substantially moving the components on either side of the valve modules.

Still another object is to provide an improved flow gathering manifold with valve modules secured thereto to control the flow from flow lines into the manifold.

A still further object is to provide an improved subsea valved manifold which includes readily removable valve modules and misalignment connectors to facilitate the connection of subsea flow lines to the manifold.

BRIEF DESCRIPTION OF THE DRAWINGS

These and other objects and advantages are hereinafter set forth and explained with reference to the drawings wherein:

FIG. 7 is a sectional view through the valve module taken transversely of the axis of the hydraulic studs.

FIG. 8 is a longitudinal sectional view of the improved hydraulic studs of the present invention.

DESCRIPTION OF THE PREFERRED EMBODIMENTS

Figure 1:
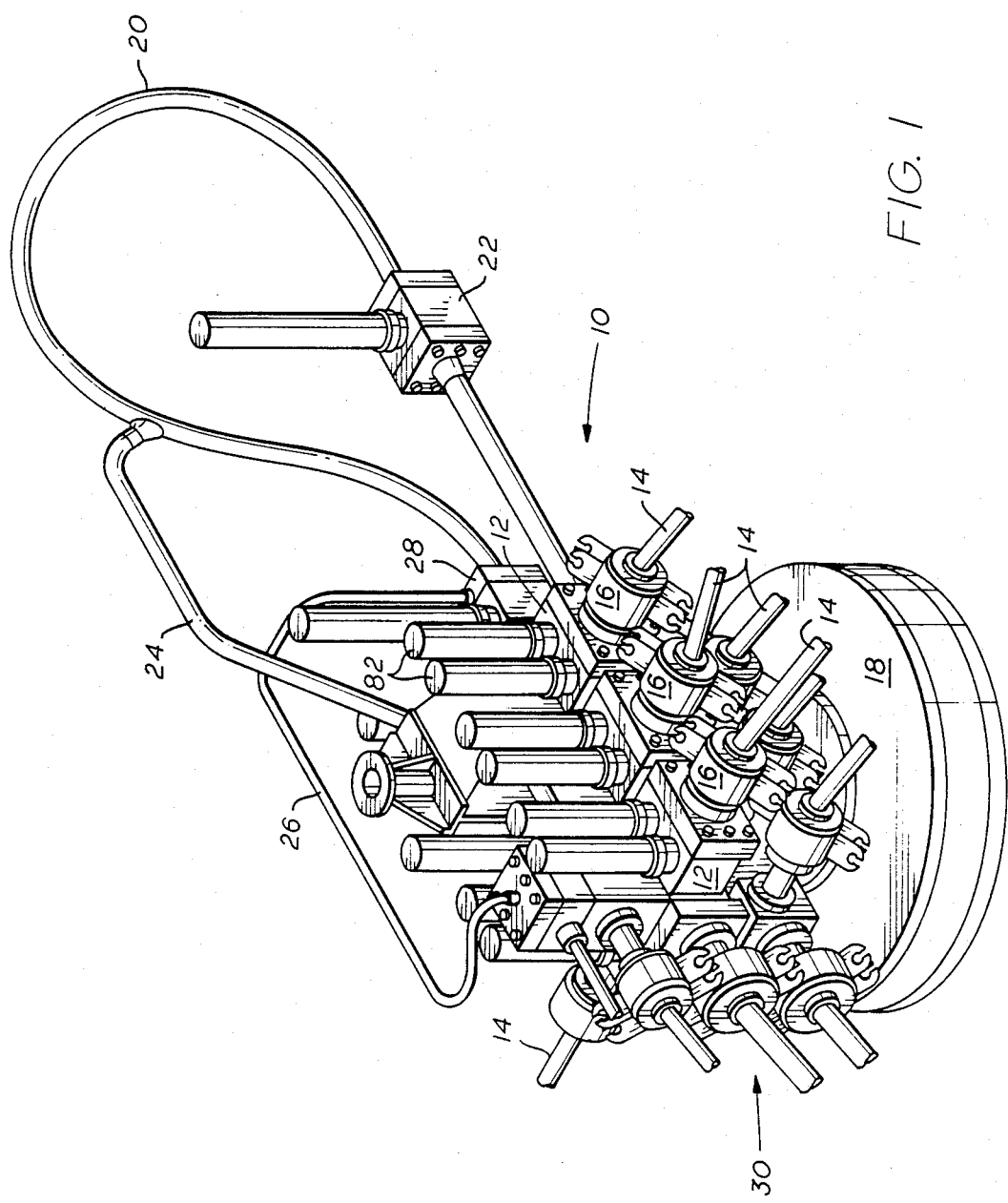
FIG. 1 is a perspective view of the improved subsea valved manifold connecting to a plurality of subsea production flow lines.

Improved valved manifold assembly 10 and the improved mounting of valve modules 12 thereto is shown in FIG. 1 in a subsea environment wherein a plurality of production flowlines 14 are connected through misalignment connectors 16 and valve modules 12 into manifold 10. The assembly is mounted on a permanent guide base 18 and includes pigging loop 20 controlled by hydraulic gate valve 22 with test line 24 connected thereto. Bypass line 26 extends from block 28 to which pigging loop 20 connects as shown. Other connections are a shown with misalignment connectors 16 being used to make the connections to the manifold assembly 10.

Figure 2:
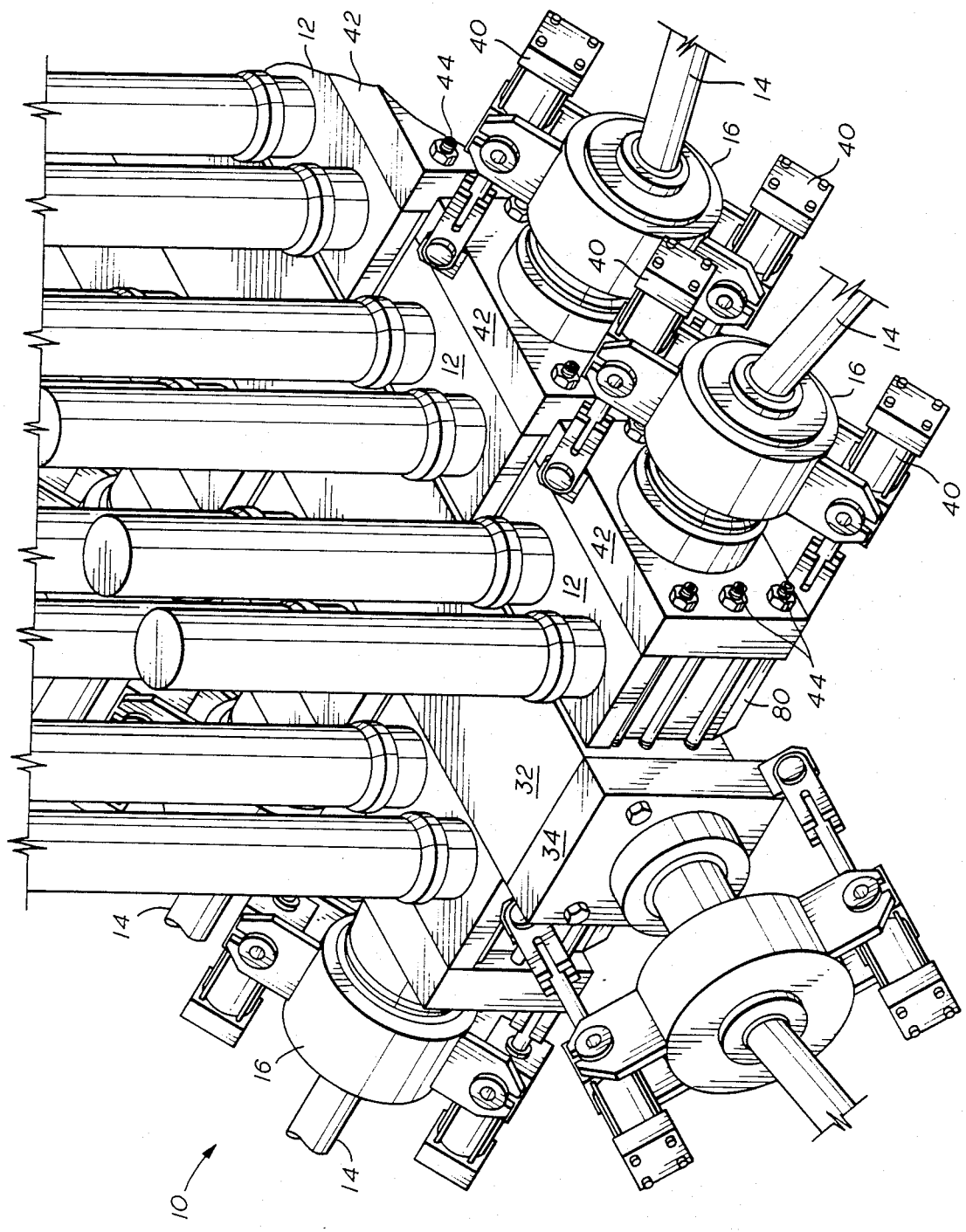
FIG. 2 is a partial detailed perspective view of the improved valved manifold shown in FIG. 1.
Figure 3:
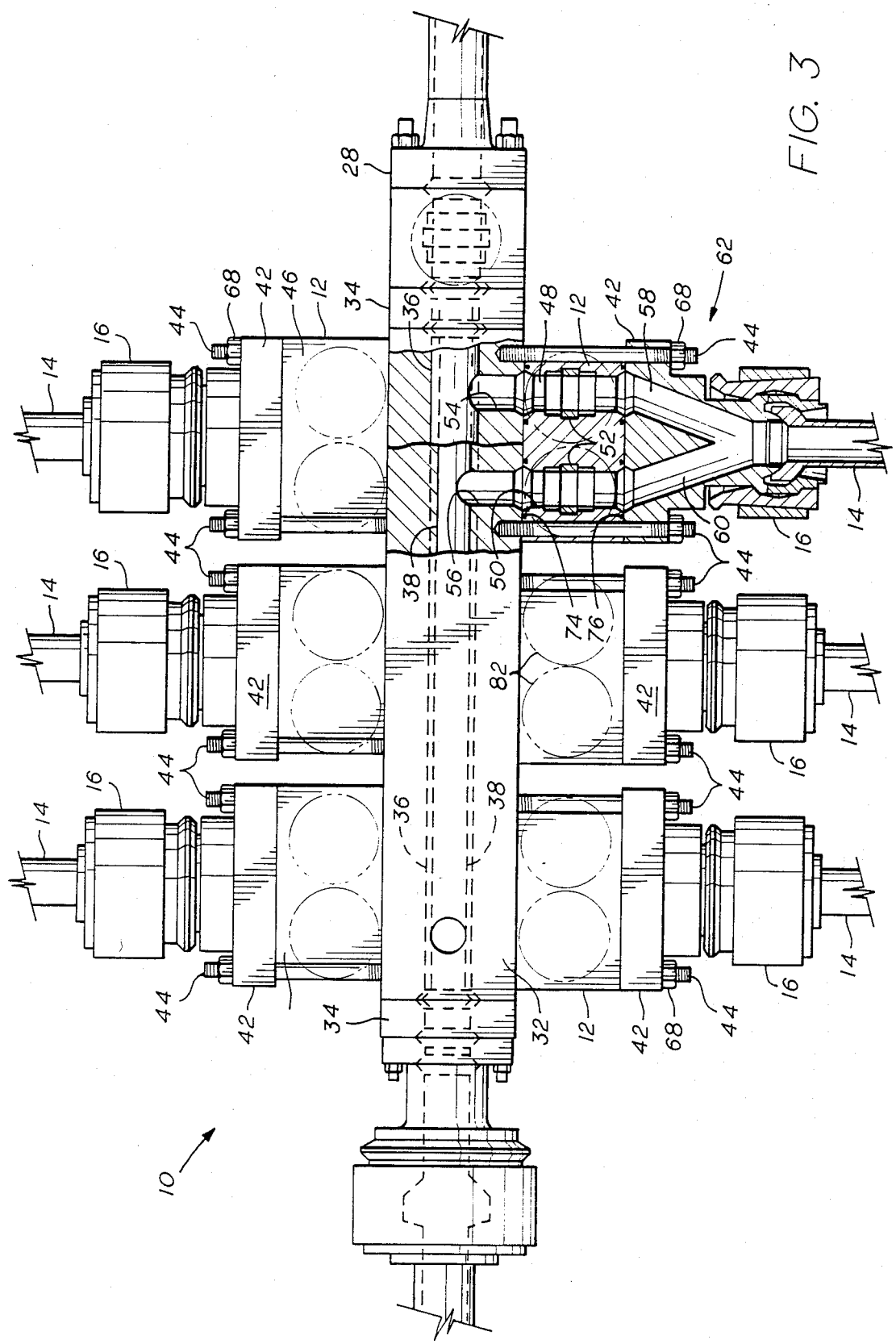
FIG. 3 is a plan view, partly in section of the improved valved manifold of the present invention.

Valved manifold 10 includes body 32 in the form of a solid block having a square cross sectional shape with end plates 34 secured to each end to provide communication out each end for longitudinal passages 36 and 38. It should be noted that each misalignment connector 16 is provided with a pair of removable actuators 40 which function to make the joint of the connector or to release it. As shown in FIGS. 2 and 3 valve modules 12 are secured between their respective sides of body 32 and diverter flange 42 of connector 16 by hydraulic tensioning stud members 44. Valve modules 12 each include body 46 having two passageways 48 and 50 therethrough with valve members 52 positioned in each passageway to control the flow therethrough. Passageways 48 and 50 are aligned with the opening through the side of manifold body 32 of transverse passages 54 and 56 which communicate with longitudinal passages 36 and 38, respectively. Passageways 48 and 50 are also aligned with the openings of passages 58 and 60 through diverter 62. Passages 58 and 60 divert from single passage 64 at the inlet end of diverter 62. The exterior of the end of diverter 62 opposite flange 42 is configured to function as a part of misalignment connector 16 which is a collet type of connector with actuators 40 moving cam ring 66 to lock the connector 16 into its connected position.

Diverter flange 42 is generally rectangular in shape as best seen in FIG. 2 and is connected to manifold body 32 by hydraulic tensioned stud members 44. Members 44 are secured to body 32 as by threading (shown in FIG. 8 and explained with reference thereto). The outer end of members 44 have suitable means 68, as hereinafter explained with reference to FIG. 8, threaded thereon to engage the outer side of diverter flange 32. When body 46 of valve modules 12 is lowered into position between manifold body 32 and diverter flange 42, tensioning members 44 are in their elongated position so that the space between diverter flange 42 and the side of manifold body 32 is greater than the width of valve module 12. This allows valve module 12 to slide in and out of its installed position easily and quickly. Care should be taken to provide some means for holding diverter flange 42 spaced from manifold body 32 to ensure that the valve module 12 moves easily in such space.

Figure 4:
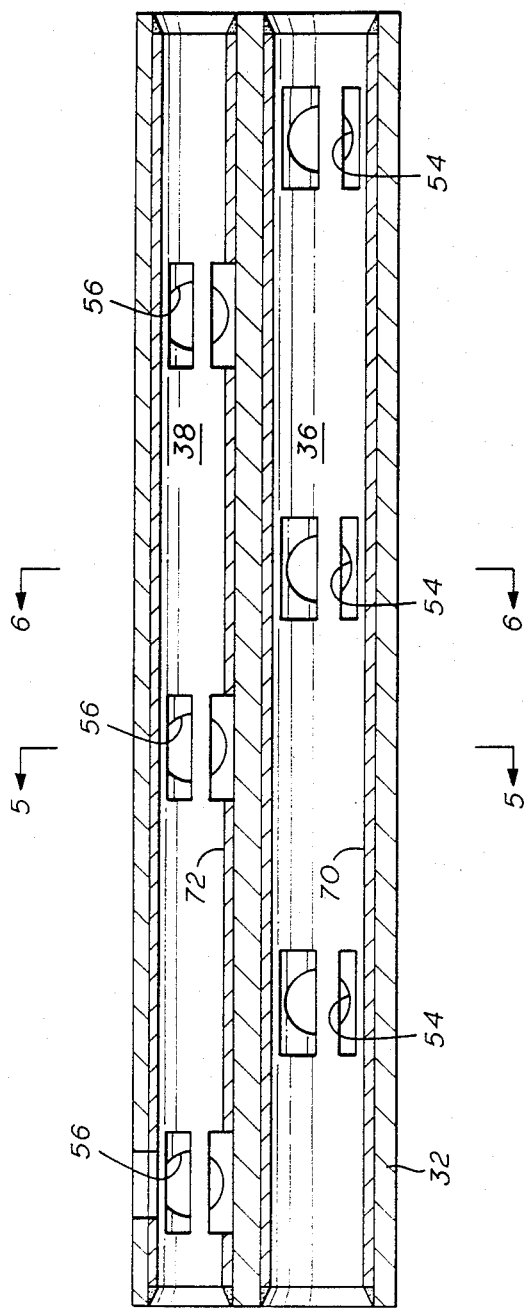
FIG. 4 is a longitudinal sectional view of the improved manifold body of the valved manifold.
Figure 6:
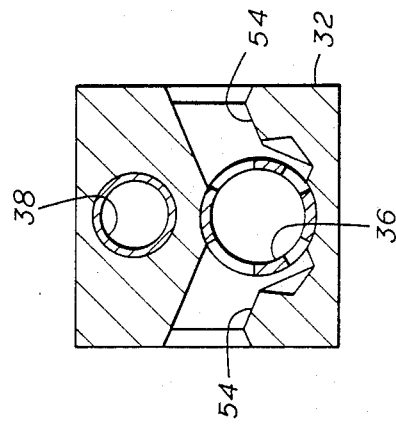
FIG. 6 is a sectional view taken along line 6—6 in FIG. 4.
Figure 5:
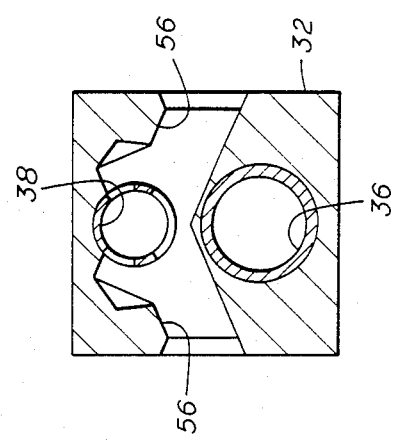
FIG. 5 is a sectional view taken along line 5—5 in FIG. 4.

The details of structure of manifold body 32 are shown in FIGS. 4, 5 and 6. As can be seen, longitudinal passages 36 and 38 which are lined with tubular members 70 and 72, extend the entire length of body 32 to guide pigs through the longitudinal passages. Transverse passage 54 extends through body 32 and communicates with longitudinal passage 36 while transverse passage 56 extends through body 32 and communicates with longitudinal passage 38. Transverse passages 54 and 56 a positioned so that their openings are on the longitudinal centerline of the sides of body 32 and are spaced from each other along such centerline and their spacing is such that they align with the openings of the passageways 48 and 50 in valve modules 12. With such alignment, suitable sealing gaskets 74, preferably flat gaskets or relatively thin gaskets, are provided in surrounding relation around such passages between body 32 and valve body 46. Additionally, other suitable sealing gaskets 76 are provided to seal around the aligned openings between valve body 46 and diverter flange 42. Flat gaskets are preferred so that the amount of elongation of stud tensioning members 44 is minimized.

Valve body 46 preferably includes flanges 78 which are engaged by the upper of stud tensioning members 44 at each side of module 12 when valve module 12 is in its preferred position with the ends of its passageways in alignment with the mating passages in manifold body 32 and diverter flange 42. This is best seen in FIG. 7. Also, all four lower sides of valve body 46 include the corner chamfer 80 which allows body 46 to be placed readily in position and the taper to the lower edges of the mating faces will assist in moving the diverter flange 42 away from manifold body 32 for the exact distance available from the elongation of stud tensioning members 44 when they are subjected to hydraulic pressure. Valve actuators 82 are mounted on the upper surfaces of valve body 46 and are connected to valve members 52 to move such members 52 to their desired positions.

Hydraulic stud tensioning members 44 as best seen in FIG. 8 includes body 84 having bore 86 extending from its outer end 88 and terminating a short distance from its closed inner end 90, external threads 92 on its inner end 90 and external threads 94 extending a substantial distance on its outer end 88, and the means 68 includes nut 96 threaded on threads 94 and adapted to engage the exteriors surface of flange 42, ring 98 threaded on the outer portion of threads 94, cap 100 threaded onto the exterior of ring 98 and extending in covering relationship to the outer open end of body 84 and piston 102 having head 104 positioned and sealed against the interior of cap 100 and piston rod 106 extending from head into bore 86 and into engagement with the end of bore 86 as shown. Vent port 108 extends through ring 98 to vent chamber 110 between the inner end of head 104 and the outer portion of ring 98 and body 84. Bore 112 extends into the outer portion of cap 100. Fitting 114 is releasably secured within bore 112 by pin 113 and includes bore 116 extending inwardly and terminating in transverse passage 118 which is in communication with annular chamber 120 spaced inwardly of sealing means 122 positioned between fitting 114 and bore 112. Passage 124 communicates from annular chamber 120 to the chamber 126 between the inner surface of cap 100 and the outer portion of piston head 104. Suitable means should be carried by divers or remotely operated vehicles or tools to deliver hydraulic fluid under pressure to fitting 114 for the simultaneous elongating energizing of all of tensioning members 44 which secure a single valve module 12 in its position engaging the manifold body 32. Fitting 114 can also be the hydraulic supply means and may be a quick disconnect-stab in type of connector having a suitable line connected on its outer end. However, bore 112 should be protected with a suitable plug (not shown) when fitting 114 is removed. The outer end of piston head 104 has cover 128 secured thereon with seal 130 positioned in groove in the exterior of head 104 and sealing between head 104 and the interior cylindrical surface 132 of cap 100.

During initial installation, tensioning members 44 extend through their respective openings in diverter flanges 42 and have their inner ends 90 threaded into threaded bores 134 in manifold body 32. For each tensioning member 44 nut 96 is threaded onto threads 94 and ring 98 and cap 100 are in position with piston 102 having its head 104 within cap 100 as shown in FIG. 8. Once a valve module 12 is in position between manifold body 32 and diverter flange 42, nuts 136 are tightened onto flange 42 to secure valve module 12 in its desired position. Whenever valve module 12 is to be released hydraulic fluid under pressure is supplied through fitting 114 so that its pressure is exerted in each tensioning member 44 between the inner surface of cap 104 and the outer surface of piston 102. This pressure creates a force exerted outwardly on cap 100 and inwardly on piston rod 106 and the threaded engagement of body 84 within manifold body 32 to cause the elongation of body 84. By applying the preselected amount of pressure of the hydraulic fluid, the exact amount of elongation of body 84 is known to be sufficient to allow quick and easy removal and installation of a valve module 12. Once a new valve module 12 is in position, the hydraulic fluid pressure is released and body 84 retracts to its original length and exerts sufficient tension force on valve body 46 to ensure its being maintained in its desired position.

Thus, with the improved mounting of the present invention, valve modules can be installed and removed by remote operation without difficulty and the replacement module is ensured of being clamped tightly between the two surfaces between which it is to be installed. Also, this structure when combined with a subsea production flowline manifold, provides a simple device which can be remotely serviced and also provides a substantially smaller valved manifold assembly.

What is claimed is:

1. A valve and valve mounting comprising
 a first mounting member,
 a second mounting member spaced from said first mounting member,
 a valve having a body, a valve member and a valve actuator,
 a plurality of hydraulic tensioning members secured by securing means to each of said mounting members, said hydraulic tensioning members having a connection for the supply of hydraulic fluid under pressure whereby said tensioning members are elongated by such pressure,
 said mounting members being spaced sufficiently apart to allow said valve body to pass therethrough when said tensioning members are elongated by hydralic pressure,
 the body of said valve having a width slightly smaller than the distance between said first and second mounting members when said tensioning members are elongated by hydraulic pressure, and
 means on said tensioning members for tightening the securing means to one of said mounting flanges while said tensioning members are elongated under pressure whereby with said valve body positioned between said flanges release of the hydraulic pressure on said tensioning members moves said flanges into tight engagement with said valve body.

2. A block manifold comprising
 an elongate body having a first longitudinal passage extending therethrough,
 means at one end of said elongate body for connecting to said first passage,
 a first transverse passage through said body communicating with said first longitudinal passage,
 a valve having a body, a passageway therethrough, a valve member and an actuator,
 said valve positioned against said body with its passage in alignment with said first transverse passage,
 a flow line having an end flange spaced from the side of said manifold body by a distance slight more than the width of said valve body,
 a plurality of hydraulic stud tensioners extending through said flange, past said valve body in spaced relation thereto and threadedly engage within said manifold body around the opening of said transverse passage, and
 a nut on each of said hydraulic stud tensioners engaging the side of said flange facing away from said manifold body,
 hydraulic pressure being supplied to said tensioners to cause them to elongate during the installation and removal of said valve body from engagement with said manifold body and venting of hydraulic pressure from said tensioners clamping said valve body tightly between said flange and said manifold body.

3. A block manifold according to claim 2 including
 a second passage extending longitudinally through said manifold body,
 means at one end of said manifold body for connecting to said second longitudinal passage,
 a second transverse passage through said body communicating with said second longitudinal passage and opening through the same side of said manifold body said first transverse passage and in close spaced relationship thereto,
 said valve having a second passageway spaced from said first passageway, a second valve member within said body and a second valve actuator connected to operate said second valve member,
 clamping of said valve body between said manifold body and said flange bringing said first passageway into alignment with said first transverse passage and said second passageway into alignment with said second transverse passage, and
 said flange including means communicating with both said first and second passageways so that said flow may be directed by operation of said first and second valve members to one of said first and second longitudinal passages through said manifold body.

4. A block manifold according to claim 3 including
 a plurality of pairs of transverse passages from said longitudinal passages to the exterior of said manifold body,
 a valve module including dual valving for each pair of transverse passages, and
 a set of hydraulic stud tensioners for clamping each of said valve modules into engagement with the side of said manifold body.

5. A block manifold according to claim 2 including
 a remotely actuated misalignment joint connecting to said flanged member from each flow line.

6. A block manifold according to claim 3 including
 a flat gasket ring surrounding each of said passageways in said valve body for sealing engagement with said manifold body and said flange.

* * * * *